Jan. 27, 1953 P. P. BEBRY Re. 23,616

LOVE SEAT BED

Original Filed Nov. 8, 1949 3 Sheets-Sheet 1

INVENTOR.
PETER P. BEBRY
BY
Clark & Att
ATTORNEYS

LOVE SEAT BED
Original Filed Nov. 8, 1949 3 Sheets-Sheet 2
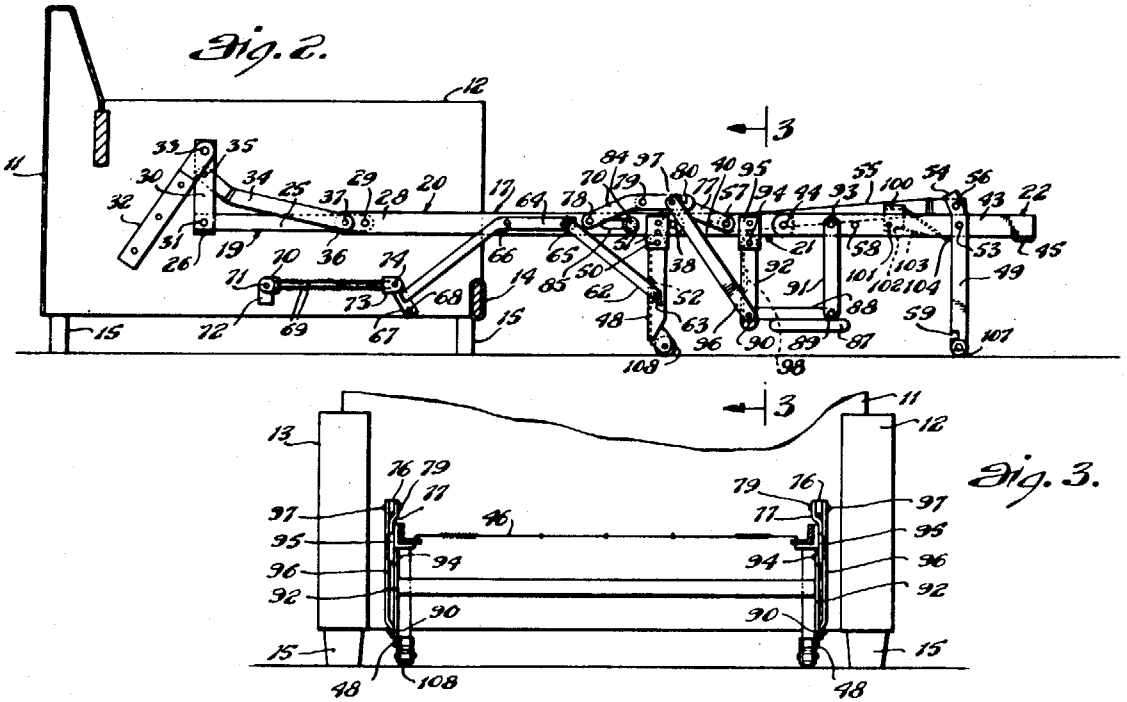
INVENTOR.
PETER P. BEBRY
BY
Clark & Ab
ATTORNEYS

LOVE SEAT BED

Original Filed Nov. 8, 1949 3 Sheets-Sheet 3

INVENTOR.
PETER P. BEBRY
BY
Clarke & Ott
ATTORNEYS

Reissued Jan. 27, 1953

Re. 23,616

UNITED STATES PATENT OFFICE 23,616

LOVE SEAT BED

Peter P. Bebry, Bayonne, N. J., assignor to Bebry Bedding Corporation, Bayonne, N. J., a corporation of New York Original No. 2,576,062, dated November 20, 1951, Serial No. 126,178, November 8, 1949. Application for reissue March 5, 1952, Serial No. 275,212

7 Claims. (Cl. 5—13)

Matter enclosed in heavy brackets [ ] appears in the original patent but forms no part of this reissue specification; matter printed in italics indicates the additions made by reissue.

This invention relates to an article of furniture of the type adapted for use as a love seat, chair, couch or the like and which may be converted into a bed.

The invention comprehends an article of furniture including a frame composed of hingedly connected sections adapted to be disposed in alignment to form a bed and which are foldable into collapsed relation within the article of furniture to provide a support for cushions to form a love seat, chair, couch or the like.

Another object of the invention is to provide an improved foldable frame which can be easily and conveniently manipulated to dispose the same either in folded or extended conditions.

Still another object of the invention is to provide a frame of said character which is sturdy in construction and which provides a rigid support when in folded relation for supporting seat cushions and when in extended bed forming relation.

Still another object of the invention is to provide a foldable frame in which the sections are adapted to automatically lock when moved to collapsed relation within the article of furniture.

Still another object of the invention is to provide a foldable frame for supporting a bed forming mattress which is retained between the folded sections with one end of the mattress extending upwardly within the back thereof when the sections are collapsed within the article of furniture.

With the foregoing and other objects in view, reference is now made to the following specification and accompanying drawings in which the preferred embodiment of the invention is illustrated.

In the drawings:

Fig. 2 is a side view of the frame with the article of furniture shown in vertical section.

Fig. 3 is a transverse vertical sectional view taken approximately on line 3—3 of Fig. 2.

Figure 1:
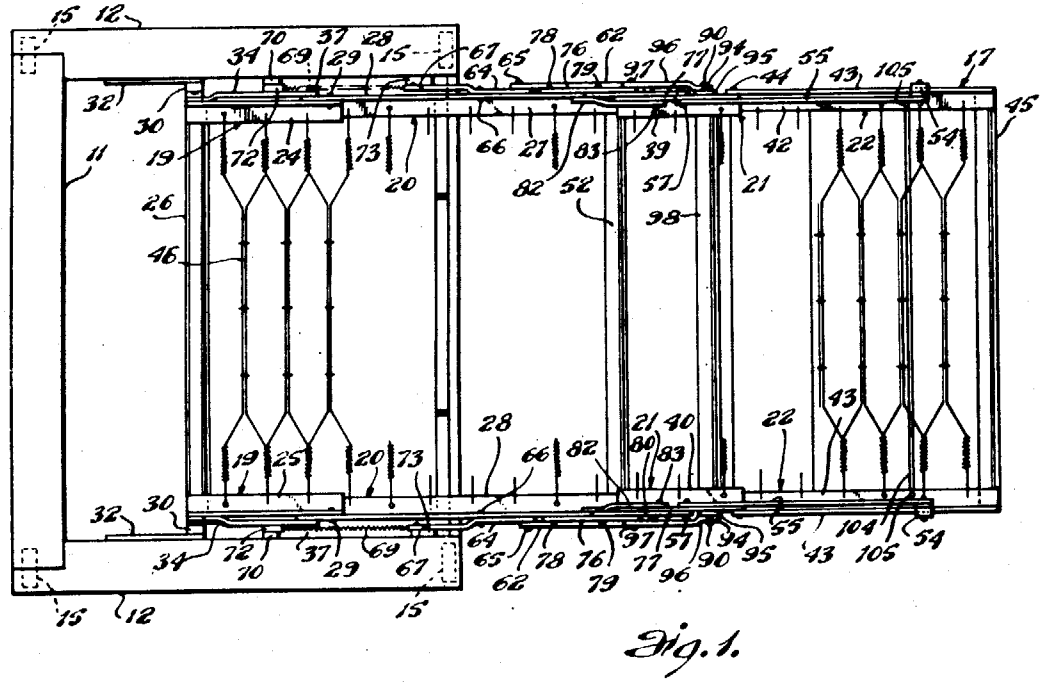
Fig. 1 is a top plan view of an article of furniture provided with a foldable frame constructed in accordance with the invention and illustrating the same in extended relation.

Referring to the drawings by characters of reference, the article of furniture is illustrated in the drawings as a love seat but which may be a chair, couch or the like, and as illustrated the love seat includes a furniture frame consisting of a back 11, oppositely disposed side panels 12 and 13 and a front panel 14 connected between the forward ends of the side panels. The frame also includes legs 15 which extend upwardly through the furniture frame forming the ends of the side panels.

A foldable metal frame 17 is pivotally connected to the furniture frame for movement from extended relation in which the same is disposed in bed forming condition to a collapsed relation within the confines of the furniture frame so as to constitute a support for seat cushions 18 to thereby serve as a love seat. The foldable frame 17 consists of four sections, namely an inner end section 19, an intermediate body section 20, a connecting section 21 and an outer end section 22 each of which is of angle iron construction consisting of a vertical flange and a horizontal flange extending inwardly from the lower edge of the vertical flange.

The inner end section 19 consists of spaced parallel side rails 24 and 25 which are connected together by a tubular cross bar 26 having flattened ends secured to the under side of the side rails at the inner ends thereof. The side rails are pivotally connected at their outer ends to the oppositely disposed side rails 27 and 28 of the intermediate body section 20 by pivot pins 29 extending through the vertical flanges thereof and with the vertical flanges of the side rails 24 and 25 of the inner end section 19 arranged within the vertical flanges of the side rails 27 and 28 of the intermediate body section 20. The inner end section 19 is supported by the furniture frame for pivotal swinging movement by [means of] *any desired means such as* upstanding arms 30 pivoted at their lower ends to the side rails 24 and 25 on pivot pins 31 and pivoted at their upper ends to the upper ends of angularly disposed bars 32 on pivot pins 33 which bars are bolted to the inner faces of the side panels 12 and 13 respectively of the furniture frame. Bent toggle arms 34 are pivotally connected at their inner ends to the upstanding arms 30 respectively on pivot pins 35 located below the pivotal connection of the bars 32 with said upstanding arms and at their outer ends the toggle arms 34 are pivotally connected with the projecting end portions 36 of the side rails 27 and 28 respectively on pivot pins 37.

The side rails 27 and 28 of the intermediate body section 20 are pivotally connected at their outer ends to the side rails 39 and 40 of the connecting section 21 on pivot pins 38 extending through the vertical flanges thereof and which sections are arranged with the vertical flanges of the intermediate body section 20 disposed outwardly of the vertical flanges of the connecting section 21. The outer ends of the said side rails 39 and 40 are pivotally connected to the side rails 42 and 43 of the outer end section 22 by pivot pins 44 extending through the vertical flanges thereof and which sections are arranged with the vertical flanges of the outer end section 22 disposed outwardly of the vertical flanges of the connecting section 21. The said side rails 42 and 43 are connected by a tubular cross bar 45 having flattened ends secured to the under side of said side rails at the outer ends thereof.

A wire mesh spring 46 of any desired construction is connected with and stretched between the inwardly directed flanges of the side rails and end bars of the foldable frame 17 for supporting a mattress 47 thereon when in extended bed forming relation and which spring is adapted to fold with the folding of the sections of the frame into collapsed condition within the furniture frame and to retain the mattress in folded relation between the sections with the inner end of the mattress extending upwardly within the back rest of the furniture frame.

In order to rigidly support the foldable frame when in extended bed forming relation, two pairs of legs 48 and 49 are provided which are respectively connected with the intermediate body section 20 and the outer end section 22 adjacent their outer ends. The upper ends of the legs 48 are pivoted on pivot pins 50 to lugs 51 rigidly secured to and depending from the side rails 27 and 28 of the intermediate body section 20. A tubular cross bar 52 having its ends flattened extends between the legs 48 and is secured to the inwardly directed flanges thereof.

The legs 49 consist of flat bars which are pivoted to the side rails 42 and 43 of the outer end section 22 on pivot pins 53 extending through the vertical flanges thereof. The legs 49 project above the outer end section 22 and terminate in [forwardly directed] upper ends 54 *which are directed toward the furniture frame and* to which the outer ends of links 55 are pivotally connected on pivot pins 56 with the inner ends of the links pivotally connected with the side rails 39 and 40 respectively on pivot pins 57 which extend through the vertical flanges thereof. The side rails 42 and 43 of the outer end section 22 are provided with outwardly projecting pins 58 adapted to engage in notches 59 formed in the inner longitudinal edges of the legs 49 when the legs are in collapsed relation with the frame for limiting the collapsing movement of said legs.

The legs 48 are braced by diagonally extending bars 62 which are pivotally connected thereto substantially medially thereof on pivot pins 63 and at their upper ends the said bars are pivotally connected to the outer ends of bent bars 64 on pivot pins 65. The bent bars 64 are pivotally connected to the outer faces of the side rails 27 and 28 respectively of the intermediate body section 20 on pivot pins 66 and have their inner ends rigidly affixed to cross bars 67. The cross bars 67 are pivoted to the inner faces of the side panels 12 and 13 of the furniture frame on pivot pins 68 and the same are tensioned by coiled contractile spring 69 secured at their inner ends to lugs 70 pivoted on pivot pins 71 to brackets 72 secured to the inside faces of said side panels 12 and 13. The outer ends of the springs 69 are secured to lugs 73 pivoted on pivot pins 74 to the free ends of the cross bars 67. The springs 69 are in stretched tensioned condition when the sections of the foldable frame are in collapsed relation with the furniture frame and function to facilitate movement thereof from a lowered collapsed condition within the furniture frame to an elevated relation in which the sections are arranged in aligned bed forming condition.

[In order to connect the sections together for effecting collapsing thereof within the confines of the furniture frame by the upward swinging movement of the outer end section 22, a pair of angulated links 76 and 77 is arranged].

*In order to latch the outer end section 22 in spaced overlying relation with the intermediate section 20 for supporting a seat cushion when in collapsed condition within the furniture frame, angulated links 76 and 77 are provided which are arranged* at each side of the foldable frame, the links 76 being pivoted against the outer faces of the vertical flanges of the side rails 27 and 28 respectively of the intermediate body section 20 on pivot pins 78, while the links 77 are pivoted against the outer faces of the vertical flanges of the side rails 39 and 40 respectively of the connecting section 21 on the pivot pins 57. The links 77 are connected at their inner ends with the links 76 intermediate the ends thereof on pivot pins 79 and the said links 76 are formed with rectangular notches 80 in the upper edges thereof adjacent their outer ends. Links 82 are also provided at each side of the foldable frame which are pivoted at their outer ends against the inside faces of the vertical flanges of the side rails 39 and 40 respectively on pivot pins 83. The inner ends of said links are provided with headed pins 84 which slidably protrude through slots 85 in the vertical flanges of the side rails 27 and 28 respectively of the intermediate body section 20, the enlarged heads at the outer ends of said pins retaining the same in engagement in said slots.

The furniture frame also includes a front panel 87 which is adapted to be disposed above the panel 14 when the foldable frame is disposed in collapsed relation within the furniture frame and which is adapted to be moved with the foldable frame when the same is disposed in bed forming relation. The said front panel 87 is rigidly affixed to links 88 which are pivoted at their opposite ends on pivot pins 89 and 90 to links 91 and 92 respectively depending from the foldable frame when the same is disposed in bed forming relation. The links 91 are pivoted at their upper ends on pivot pins 93 against the outer faces of the vertical flanges of the side rails 42 and 43 respectively of the outer end section 22, while the links 92 are pivoted on pivot pins 94 to depending lugs 95 affixed to the outer faces of the vertical flanges of the side rails 39 and 40 respectively of the connecting section 21. Diagonally extending links 96 are pivoted at their lower ends against the outer faces of the links 92 on the pivot pins 90 and at the upper ends the said links 96 are pivoted against the outer faces of the links 76 respectively on pivot pins 97. The links 92 are of angle iron formation in cross-section and have a tubular cross bar 98 connected therebetween with the outer ends of the cross bar flattened and riveted or otherwise secured to the inwardly directed flanges thereof.

Figure 4:
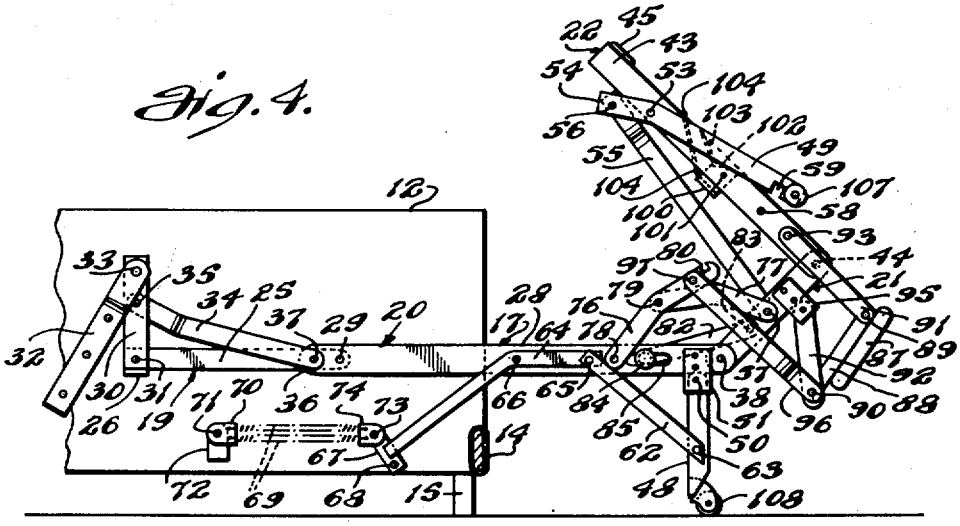
Fig. 4 is a view similar to Fig. 2 with the frame shown in partially folded relation.
Figure 5:
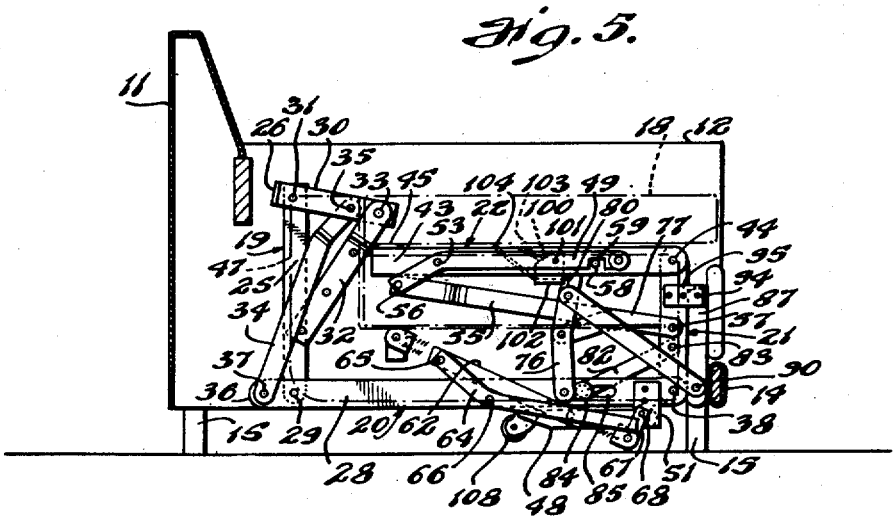
Fig. 5 is a side view of the frame shown in fully folded condition within the article of furniture and with the latter shown in vertical section.

In moving the foldable frame 17 from an extended bed forming relation to a collapsed condition within the furniture frame, the outer end section 22 is swung upwardly on its pivotal connection with the connecting section 21. The upward swinging movement thereof causes the legs 49 to swing inwardly about their pivotal connection with said section so that the legs are swung into substantially parallel relation therewith to dispose the notches 59 in engagement with the pins 58 to thereby prevent further inward collapsing movement of said legs. The outer end section 22 is then moved inwardly to rock the connecting section 21 on its pivotal connection with the intermediate body section 20 as illustrated in Fig. 4 of the drawings. This raises the links 82 from aligned position with the sections to an angular position as illustrated in Fig. 4 of the drawings and when the headed pins 84 engage against the inner ends of the slots 85, the connecting section 21 will be disposed in right angular relation with the intermediate body section 20 and the outer end section 22 will be parallel with the intermediate body section 20. The intermediate body section 20 is then [tilted] *raised so as to tilt the same* into an inclined position and swung inwardly and downwardly about its pivotal connection with the inner end section 19 to dispose the said inner end section 19 in vertical relation as illustrated in Fig. 5 of the drawings. This movement of the intermediate body section 20 causes the bent bars 64 to rock about the pivot pins 66 and the cross pins 67 to rock about the pivot pins 68 whereby the intermediate body section 20 is located within the furniture frame at the rear of the panel 14 and with the panel 87 closing the opening above the panel 14 and hiding the upper portion of the foldable frame.

Swinging of the intermediate body section 20 about its pivotal connection with the inner end section 19 lowers the three outer sections to the position shown in Fig. 5 whereby the outer end section 22 is at the proper elevation for receiving seat cushions 18 shown in broken line in Fig. 5 for use as a love seat or the like. The mattress 47 folds with the foldable frame 17 to dispose the outer section of the mattress in doubled relation upon the inner section thereof and with the inner end of the inner section moved to an upwardly extending position within the back of the furniture frame.

The [foldable frame sections] *outer end section 22 and the intermediate section 20 of the foldable frame* are latched in collapsed folded relation within the furniture frame by means of latch elements 100 pivoted against the inside faces of the side rails 42 and 43 of the outer end section 22 on pivot pins 101 which latch elements depend below the side rails when the sections are in collapsed relation and are provided with horizontal flanges 102 adapted to automatically engage in the notches 80 in the links 76 when the outer end section 22 is moved to horizontal relation in the furniture frame. The latch elements 100 are engaged by leaf springs 103 secured to the horizontal flanges of the side rails 42 and 43 for swinging the latch elements on the pivot pins 101 to tension the same into engagement in the notches 80. In order to release the latch elements from latched engagement with the links 76, a cord 104 extends across the wire mesh spring 46 with the ends thereof extending through openings 105 in the horizontal flanges of the side rails 42 and 43 of the end section 22 and with the opposite ends of the cord secured to the latch elements 100 respectively. By an upward pull on the cord 104 the latch elements 100 are rocked on their pivots 101 to free the same from latched engagement with the links 76 whereupon the outer end section 22 may be swung upwardly for moving the sections to aligned bed forming relation. The wire mesh spring 46 is preferably provided with a fabric covering (not shown) which overlies the end section 22 when in collapsed relation. The cord 104 is adapted to extend through the fabric covering for grasping the same to free the sections from collapsed folded relation. When in latched engagement, the links 76 provide supports at each side of the foldable frame for supporting the outer end section 22 in horizontal relation as shown in Fig. 5 of the drawings.

*The doubling over of the outer section of the mattress on the inner section by the collapsing of the foldable frame, as illustrated in Fig. 5 of the drawings, compresses the doubled-over portions of the mattress sections which tends to force the intermediate and outer end sections of the foldable frame apart. Latching of these sections together as hereinbefore described takes up the tension tending to spread the said sections apart.*

What is claimed is:

1. In an article of furniture of the character described, a furniture frame, a foldable seat and bed forming frame composed of an inner section, an intermediate body section, a connecting section and an outer end section, [upwardly extending] arms pivotally connected to the opposite sides of said inner section *to extend upwardly therefrom when said section is in bed forming relation* and pivotally connected at their upper ends to the furniture frame, means pivotally connecting said sections together in end to end relation for movement thereof from a collapsed folded condition within the furniture frame to an extended condition in which the sections are arranged in longitudinal alignment, legs pivotally connected to the opposite sides of said intermediate body section and *legs pivotally connected* to the opposite sides of said outer end section adjacent the outer [ends] *end* thereof, link members pivotally connected to the legs of the outer end section and to said connecting section for swinging movement of said legs into alignment with said outer end section upon movement of said sections to folded relation, a link member bridging the pivotal connection between said intermediate body and connecting sections at each side thereof and [each link] *the link at each side* having a pivotal connection at one end with one of said sections and a pin and slot connection with the other section for limiting the collapsing movement of the connecting section to right angular relation with the intermediate body section, a pair of pivotally connected links at each side of said foldable frame, one of the links of each pair being pivotally connected to the connecting section and the other link of each pair being pivotally connected to the intermediate body section, said last mentioned link of each pair having a notch in its outer end, and latch elements pivotally connected to the outer end section and adapted to engage in said notches when the sections are disposed in collapsed folded condition within the furniture frame with the connecting section arranged in right angular relation with the intermediate body section and the outer end section disposed in overlying relation with the intermediate body section for supporting a seat cushion.

2. In an article of furniture of the character described, a furniture frame, a foldable seat and bed forming frame composed of an inner section, an intermediate body section, a connecting section and an outer end section, [upwardly extending] arms pivotally connected to the opposite sides of said inner section *to extend upwardly therefrom when said section is in bed forming relation* and pivotally connected at their upper ends to the furniture frame, means pivotally connecting said sections together in end to end relation for movement thereof from a collapsed folded condition within the furniture frame to an extended condition in which the sections are arranged in longitudinal alignment, legs pivotally connected to the opposite sides of said outer end section adjacent the outer [ends] *end* thereof, link members pivotally connected to the legs of the outer end section and to said connecting section for swinging movement of said legs into alignment with said outer end section upon movement of said sections to folded relation, a link member bridging the pivotal connection between said intermediate body and connecting sections at each side thereof and [each link] *the link at each side* having a pivotal connection at one end with one of said sections and a pin and slot connection with the other section for limiting the collapsing movement of the connecting section to right angular relation with the intermediate body section, a pair of pivotally connected links at each side of said foldable frame, one of the links of each pair being pivotally connected to the connecting section and the other link of each pair being pivotally connected to the intermediate body section, said last mentioned link of each pair having a notch in its outer end, spring actuated latch elements pivotally connected to the outer end section and adapted to engage in said notches when the sections are disposed in collapsed folded condition within the furniture frame with the connecting section arranged in right angular relation with the intermediate body section and the outer end section disposed in overlying relation with the intermediate body section for supporting a seat cushion, and a flexible element extending across said outer end section and connected at its ends to said latch elements for releasing said sections from latched engagement by an upward pull on said flexible element.

3. In an article of furniture of the character described, a furniture frame, a foldable seat and bed forming frame composed of an inner section, an intermediate body section, a connecting section and an outer end section, [upwardly extending] arms pivotally connected to the opposite sides of said inner section *to extend upwardly therefrom when said section is in bed forming relation* and pivotally connected at their upper ends to the furniture frame, means pivotally connecting said sections together in end to end relation for movement thereof from a collapsed folded condition within the furniture frame to an extended condition in which the sections are arranged in longitudinal alignment, legs pivotally connected to the opposite sides of said intermediate body section and *legs pivotally connected* to the opposite sides of said outer end section adjacent the outer [ends] *end* thereof, a pair of pivotally connected links at each side of said foldable frame, one of the links of each pair being pivotally connected to the connecting section and the other link of each pair being pivotally connected to the intermediate body section, said last mentioned link of each pair having a notch in its outer end, and latch elements pivotally connected to the outer end section and adapted to engage in said notches to secure the sections in collapsed folded condition within the furniture frame with the outer end section disposed in overlying spaced relation with the intermediate body section for supporting a seat cushion.

4. In an article of furniture of the character described, a furniture frame, a foldable seat and bed forming frame composed of an inner section, an intermediate body section, a connecting section and an outer end section, [upwardly extending] arms pivotally connected to the opposite sides of said inner section *to extend upwardly therefrom when said section is in bed forming relation* and pivotally connected at their upper ends to the furniture frame, means pivotally connecting said sections together in end to end relation for movement thereof from a collapsed folded condition within the furniture frame to an extended condition in which the sections are arranged in longitudinal alignment, legs pivotally connected to the opposite sides of said intermediate body section and *legs pivotally connected* to the opposite sides of said outer end section adjacent the outer [ends] *end* thereof, a pair of pivotally connected links at each side of said foldable frame, one of the links of each pair being pivotally connected to the connecting section and the other link of each pair being pivotally connected to the intermediate body section, said last mentioned link of each pair having a notch in its outer end, latch elements pivotally connected to the outer end section and adapted to engage in said notches to secure the sections in collapsed folded condition within the furniture frame with the outer end section disposed in overlying spaced relation with the intermediate body section for supporting a seat cushion, and a flexible element extending across said outer end section and connected at its ends to said latch elements for releasing said sections from latched engagement by an upward pull on said flexible element.

*5. In an article of furniture of the character described, a furniture frame, a foldable seat and bed forming frame composed of an inner section, an intermediate section, a connecting section and an outer end section, means pivotally connecting said sections together in end to end relation, means pivotally connecting the inner section to the furniture frame for movement of the foldable frame from a collapsed folded condition within the furniture frame in which the inner section and the connecting section are in upwardly extending relation and the intermediate section and the outer end section are in spaced substantially horizontal relation to an extended condition in which the sections are arranged in longitudinal alignment, a spring fabric secured to and within said foldable frame, a mattress supported by said spring fabric, said mattress folding with said foldable frame into doubled over relation between the intermediate and outer end sections, pivotally connected links, one of said links being pivotally connected to the intermediate section and the other link being pivotally connected to the connecting section, a latch element connected to the outer end section, and said latch element and one of said links having interengageable means adapted to engage to secure the outer end section in overlying spaced relation with the intermediate section and the doubled over portion of the mattress retained therebetween for supporting a seat cushion on said outer end section when the sections are in collapsed folded condition within the furniture frame.*

*6. In an article of furniture of the character*

*described, a furniture frame, a foldable seat and bed forming frame composed of an inner section, an intermediate section, a connecting section and an outer end section, means pivotally connecting said sections together in end to end relation, means pivotally connecting the inner section to the furniture frame for movement of the foldable frame from a collapsed condition within the furniture frame in which the inner section and the connecting section are in upwardly extending relation and the intermediate section and the outer end section are in spaced substantially horizontal relation to an extended condition in which the sections are arranged in longitudinal alignment, a spring fabric secured to and within said foldable frame, a mattress supported by said spring fabric, said mattress folding with said foldable frame into doubled over relation between the intermediate and outer end sections, pivotally connected links, one of said links being pivotally connected to the intermediate section and the other link being pivotally connected to the connecting section, a latch element pivotally connected to the outer end section, said latch element and one of said links having interengageable means adapted to engage to secure the outer end section in overlying spaced relation with the intermediate section and the doubled over portion of the mattress retained therebetween for supporting a seat cushion on said outer end section when the sections are in collapsed folded condition within the furniture frame, and an element carried by said outer end section and connected to said latch element for releasing said sections from latched engagement.*

*7. In an article of furniture of the character described, a furniture frame, a foldable seat and bed forming frame composed of an inner section, an intermediate section, a connecting section and an outer end section, means pivotally connecting said sections together in end to end relation, means pivotally connecting the inner section to the furniture frame for movement of the foldable*

*frame from a collapsed folded condition within the furniture frame in which the inner section and the connecting section are in upwardly extending relation and the intermediate section and the outer end section are in spaced substantially horizontal relation to an extended condition in which the sections are arranged in longitudinal alignment, a spring fabric secured to and within said foldable frame, a mattress supported by said spring fabric, said mattress folding with said foldable frame into doubled over relation between the intermediate and outer end sections, a pair of pivotally connected links at each side of said foldable frame, one of the links of each pair being pivotally connected to the connecting section and the other link of each pair being pivotally connected to the intermediate section, latch elements pivotally connected to the outer end section, said latch elements and one of the links of each pair having interengageable means adapted to engage to secure the outer end section in overlying spaced relation with the intermediate section and the doubled over portion of the mattress retained therebetween for supporting a seat cushion on said outer end section when the sections are in collapsed folded condition within the furniture frame, and an element carried by said outer end section and connected to said latch elements for releasing said sections from latched engagement.*

PETER P. BEBRY.

REFERENCES CITED

The following references are of record in the file of this patent or the original patent:

UNITED STATES PATENTS

| Number | Name | Date |
|---|---|---|
| 1,081,590 | Dyke | Dec. 16, 1913 |
| 1,148,019 | Jacobs | July 27, 1915 |
| 1,216,627 | Tauber | Feb. 20, 1917 |
| 2,352,989 | Woller | July 4, 1944 |
| 2,576,677 | Freemon et al. | Nov. 27, 1951 |